United States Patent
Boone et al.

[15] 3,698,164
[45] Oct. 17, 1972

[54] AUTOMATIC HEADER HEIGHT CONTROL SENSED FROM FLOATING CROP ENGAGING MECHANISM

[72] Inventors: Jerry C. Boone; Lawrence E. Allen, both of Independence, Mo.

[73] Assignee: Allis-Chalmers Manufacturing Company, Milwaukee, Wis.

[22] Filed: July 9, 1970

[21] Appl. No.: 53,444

[52] U.S. Cl. ..................56/10.4, 56/208, 56/DIG. 15
[51] Int. Cl. ............................................A01d 67/00
[58] Field of Search ...........56/10.4, DIG. 5, 208-217

[56] References Cited

UNITED STATES PATENTS

| | | | |
|---|---|---|---|
| 2,750,727 | 6/1956 | Wright | 56/208 |
| 3,383,845 | 5/1968 | Hirsch et al. | 56/208 |
| 3,137,984 | 6/1964 | Shonkwiler | 56/214 |
| 2,473,655 | 6/1949 | Lohn | 56/208 |
| 3,286,448 | 11/1966 | Moore | 56/208 |

Primary Examiner—Louis G. Mancene
Assistant Examiner—J. A. Oliff
Attorney—Kenneth C. McKivett, Charles L. Schwab and Robert B. Benson

[57] ABSTRACT

A combined electrical, mechanical and hydraulic mechanism in a combine harvester wherein the cutter bar rides on the ground and is mounted on the forward end of a frame member having its rear end pivotally attached to a cut crop receiving mechanism on the harvester. A feeler member mounted on the cut crop receiving mechanism contacts the frame member for actuating a control to raise or lower the cut crop receiving mechanism for maintaining the position of the cut crop receiving mechanism relative to the cutter bar. A manual control for raising or lowering the cut crop receiving mechanism is also provided.

11 Claims, 6 Drawing Figures

PATENTED OCT 17 1972 3,698,164

Inventors
Jerry R. Boone
Lawrence E. Allen
By Kenneth P. Luckritz
Attorney

AUTOMATIC HEADER HEIGHT CONTROL SENSED FROM FLOATING CROP ENGAGING MECHANISM

The present invention relates to combines, and more particularly to a combine header and means for automatically adjusting the height of the header so as to position the header at the proper height to accommodate variations in ground levels.

One of the features of the present invention is that this device does not require the header itself to be constantly adjusted automatically to a very precise and often minute distance above the ground surface.

The prior art has provided automatic controls capable of controlling header and sickle cutting height within a tolerance of approximately 2 inches of a preselected height above the ground. For example, a preselected height of 3 would be expected to provide a cutting height range of 1 to 5 inches. In practice, however, a greater range may be realized for the reason that the cutting height is automatically controlled relative to the highest point of the ground elevation being encountered and also that the header is supported in virtually a level position laterally, therefore the cutting height will not be uniform throughout the full width of the swath unless the ground is parallel to the header.

This prior art system has been satisfactory only in situations where a cutting height tolerance range of 6 or more inches is acceptable. In these situations, however, there is little need for an automatic header height control.

It is not uncommon to encounter crops and situations where harvesting within a tolerance range near 1 to 2 inches above the ground is necessary. In these situations existing automatic controls are not adequate and manually controlling the cutting height by frequent and minute adjustments becomes a necessary though laborious and tedious task.

It is therefore a principal object of this invention to provide an improved structure that will satisfy the above explained harvest conditions.

The improvement has been accomplished by mounting the cutter bar and sickle on the header in a manner in which they are free to float several inches relative to header and by providing skids or the like attached to the cutter bar structure to slide along the ground surface and support the cutter bar at a preselected distance above the ground. The floating cutter bar, having considerably less mass than the header, can respond more readily to changes in the terrain, within the limits within which it is free to float, than is possible when the entire mass of the header must be adjusted. In utilizing a floating cutter bar, it is now practical to control the header height automatically for the following reasons:

1. The header is not required to adjust in response to each small and frequent change in the terrain.
2. Adjustment of the header is required only at such times when the floating cutter bar near the extremes of its free float travel.
3. Precision in the amount of automatic adjustment of the header is much less critical requiring only that it be somewhat less than the cutter bar free travel.
4. The header height can now be controlled relative to the cutter bar within broader tolerance limits.

In the foregoing discussion the crop engaging device is a floating cutter bar used for cutting the crop at a preselected height above the ground. Crop engaging devices other than cutter bars are often used in combine harvesting that require controlled relationship to the ground. Such devices may also be floatably attached to the header and utilize skids or wheels to contact the ground.

It is therefore an object of this invention to provide an automatic header height control for combine harvesters which senses from a floatably mounted crop engaging mechanism.

It is a further object of this invention to provide an automatic header control device which does not require precise adjustment of the header height relative to the ground but rather it provides that the header may be controlled to a much less precise crop receiving position relative to a floating crop engaging device.

More particularly, it is an object of this invention to provide an improved automatic header control apparatus. The prior art provides various systems for controlling the height of a combine header, however, they have each had the shortcoming of occupying considerable space under the combine header and thereby making it difficult to cut the crop close to the ground. It is particularly important when harvesting crops such as soybeans, for example, to cut very close to the ground and therefore, a header control apparatus which maintains the cutting level several inches above the ground would be unsatisfactory for use on combines harvesting soybeans or the like.

A flexible cutter head has been developed for following the ground contour closely and such type of cutter head is well adapted for use on combines harvesting soybeans or the like. Whereas, the prior art types of apparatus for controlling the height of a combine header usually were provided with feeler fingers which actuated the height control mechanism when the ground was contacted. It is a primary object of this invention to provide a height control apparatus wherein the feeler mechanism does not contact the ground but functions from contact with the resilient means which supports the flexible cutter bar.

Another object of this invention is to provide a height control apparatus wherein the feeler member therein is positioned out of contact with the ground.

It is a still further object of this invention to provide a combine having an automatic header height control mechanism which includes means for preventing clogging of the feeler members.

Furthermore, it is an object of the present invention to provide for the automatic control with a generally simple and commercially feasible device presenting a maximum amount of convenience to the combine operator.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
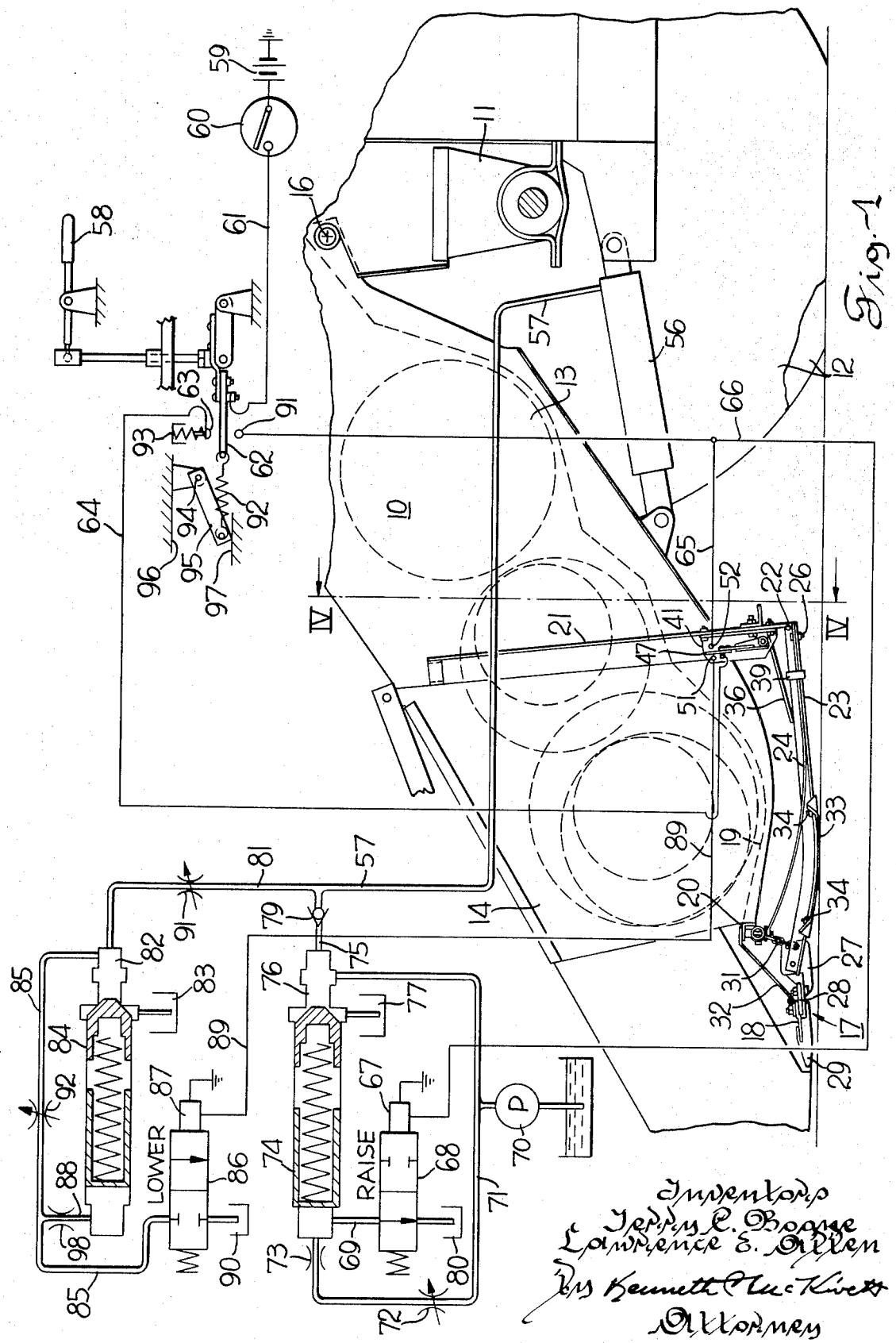
FIG. 1 is a side elevation of a portion of a combine harvester embodying the invention with some portions shown diagrammatically to better illustrate the invention.

Referring to drawings, which illustrate a preferred embodiment of the invention, FIG. 1 illustrates fragmentarily the front side of a combine harvester 10 including a main frame 11 supported on traction wheels 12 and a thresher housing 13 what a header or cut crop receiving and conveying mechanism 14 attached to the front end of the housing with the rear end of the thresher housing being pivotally mounted on frame 11 for movement about a transverse axis 16.

Header 14 is provided with a floatably mounted crop engaging device 17 which in the present instance includes a flexible type cutter bar structure 18 positioned beneath floor 19 of header 14. Floor 19 is attached to transversely extending angle iron 20 at the forward end and is attached at the rear to generally vertically extending angle members (not shown). A series of transversely spaced vertically extending strap members 21 are attached to the rear of floor 19. The rear end of cutter bar structure 17 is pivotally connected to the lower ends of these strap members 21 for pivotal movement about the transverse axis of bolts 22.

Extending forwardly from the lower end of each strap member 21 is a support structure including an angle iron or frame member 23 and a flat spring 24. The flat spring 24 is attached to angle iron 23 by bolt 26 and extends forwardly to a point where it is joined to angle iron 20 at the front end of the header. The forward end of angle iron or frame member 23 is provided with a coupling member 27 to which is joined a transversely extending flexible cutter bar 28 and sickle guard 29. A chain 31 joins coupling 27 with the forward end of floor 19. A shield member 32 is attached at its lower end to sickle guards 29 and extends upwardly rearwardly over the forward edge of angle iron 20. This shield is not attached at its upper end but merely slides over the front end of the header as the sickle bar assembly 28 raises and lowers in following ground configuration. Near the forward end of angle iron 23, a riding shoe 33 is attached by means of bolts 34. These shoes 33 ride on the ground following the contour thereof and causing cutter bar structure 17 to pivot about bolts 22 in response to the contour.

Figure 2:
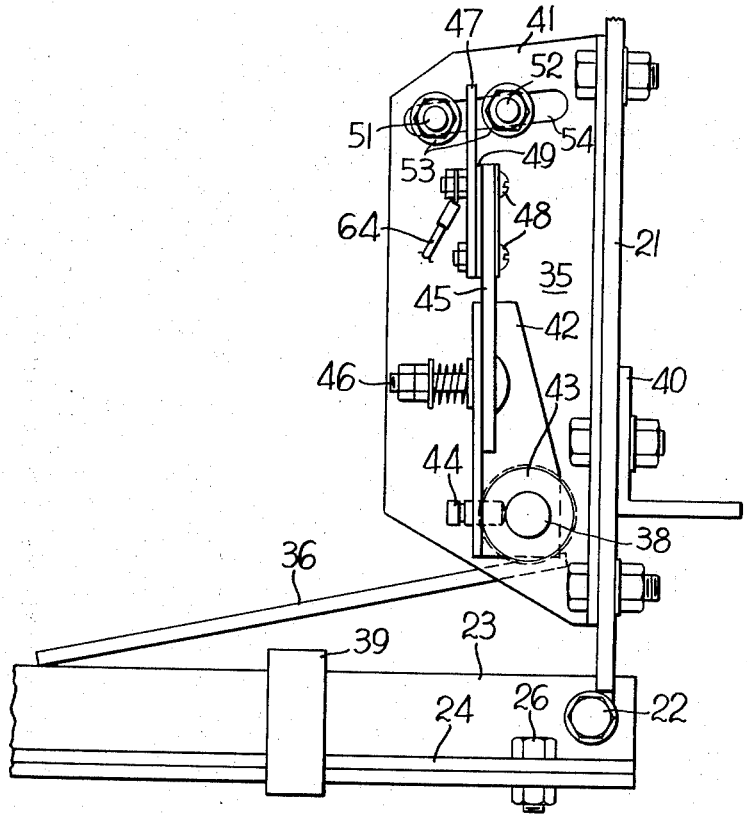
FIG. 2 is an enlarged portion of FIG. 1 showing the construction of the feeler member.
Figure 3:
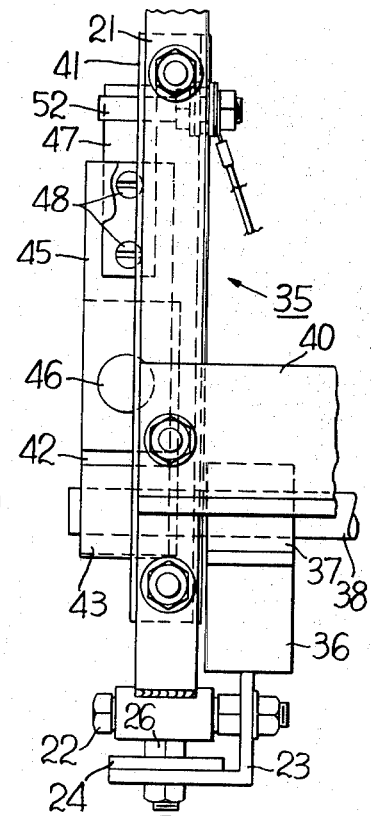
FIG. 3 is a rear elevation view of the structure shown in FIG. 2.
Figure 4:
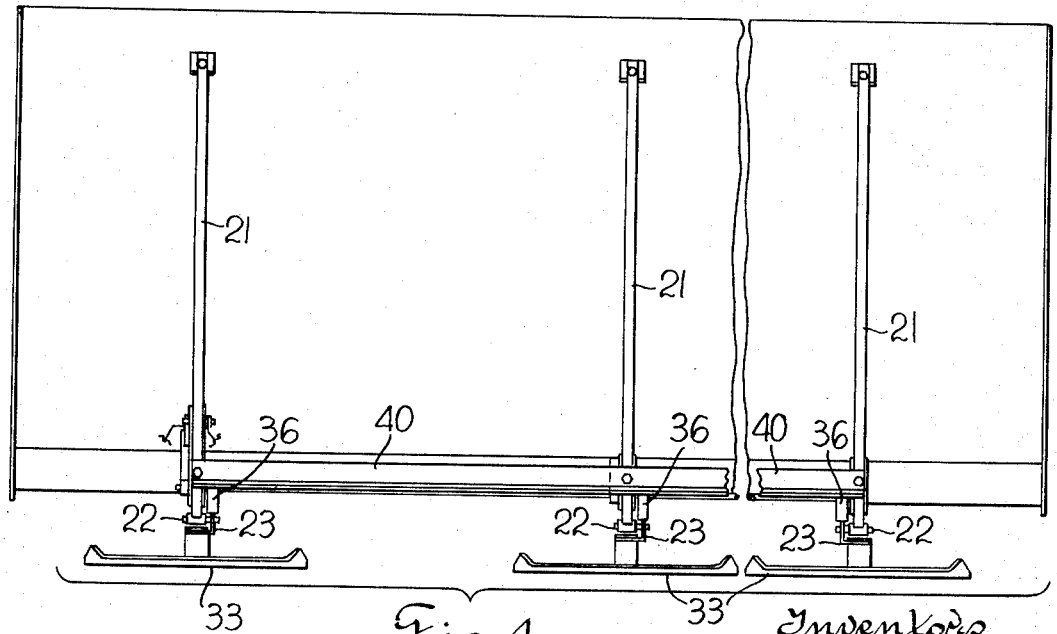
FIG. 4 is a view taken on line IV—IV of FIG. 1 with the center portion removed.

An automatic header height control mechanism 35 is provided including feeler members 36 (FIG. 2) which are attached at one end to collar member 37 which is attached to transverse shaft 38 for movement therewith. The other end of feeler members 36 is positioned in contact with frame member 23. Angle iron 23 and spring 24 are provided with a clamp 39 which is longitudinally slidable to increase the action of spring 24 on angle iron 23. A transverse angle iron 40 is joined to lower portions of straps 21 to hold them in position.

An angle iron bracket 41 is attached to the left-hand member 21 and rotatably receives one end of shaft 38.

An angle plate 42 is attached to collar 43 which in turn is attached to shaft 38 by means of cap screw 44. An arm 45 is attached to plate 42 by means of a spring bolt combination 46. A switch member 47 is attached to the upper end of arm 45 by means of bolts 48. Switch member 47 is spaced from arm 45 by insulating member 49. The distal end of switch 47 is positioned between two electrical contacts 51 and 52 which are fastened to plate 41 by conventional means and insulated from plate 41 by washers 53. Contacts 51 and 52 can be adjusted along slot 54 to vary the neutral period wherein the control means 35 would not be acting to raise or lower header 14. A hydraulic ram 56 (FIG. 1) is connected between frame 11 and housing 13. Ram 56 is provided with a hydraulic line 57 connected to control means which will be described later.

Figure 5:
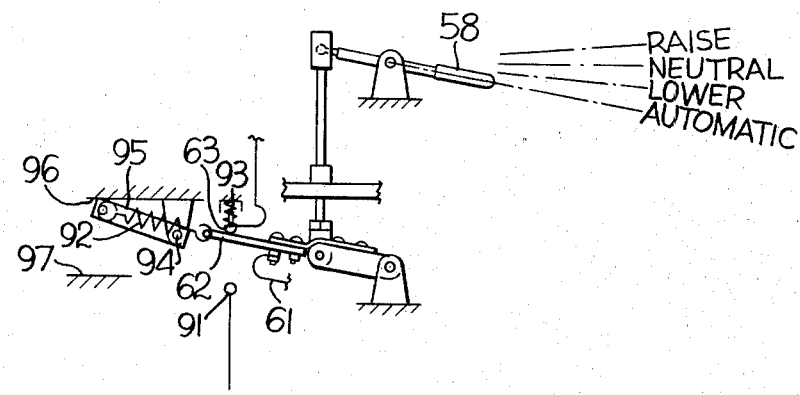
FIG. 5 is a diagrammatic view of the manual operating lever and its associated linkage when the lever is positioned for automatic operation.

Assume that the operating lever 58 is positioned for automatic operation as shown in FIG. 5 and that header 14 is too low so that feeler 36 (FIG. 1) in contact with angle iron 23 would cause switch 47 to engage contact 52. This would result in electrical energy flowing from battery 59 through switch 60, through line 61, through switch 62, through contact 63, through line 64, through switch 47, through contact 52 and through lines 65 and 66 to solenoid 67 which is actuated to move valve 68 into blocking relation to passage 69. Pressure fluid supplied by pump 70 would then flow through line 71 and valves 72 and 73 to poppet valve 74. With passage 68 blocked the pressure fluid would act on the rear end of poppet valve 74 moving it to the right and blocking chamber 76 preventing it from emptying into sump 77. Pressure would build up in line 75 until fluid would flow through check valve 79 into line 57 and act on hydraulic cylinder 56 to pivot header 14 upwardly about pivot 16 until contact was lost between switch member 47 and terminal 52. When contact is lost, solenoid valve 67 would return valve 68 to the position shown in FIG. 1 and with line 69 would return valve 68 to the position shown in FIG. 1 and with line 69 now discharging in sump 80, the left-hand end of poppet valve 74 would no longer be pressurized and the right-hand end would move away from its seat providing access to sump 77 for chamber 76. Fluid pressure in cylinder 56 is maintained keeping the header at the selected position because check valve 79 blocks the return of pressure fluid from cylinder 56 and the pressure fluid in line 81 connects with a chamber 82 which is blocked from sump 83 by poppet valve 84. Chamber 82 is also provided with a line 85 connected to solenoid valve 86 actuable by a solenoid 87. A line 88 connects line 85 to the left-hand end of poppet valve 84 providing hydraulic pressure for keeping poppet valve 84 seated.

Now assume that the operating lever 58 is positioned for automatic operation as shown in FIG. 5 and the header 14 is too high so that the feeler 36 (FIG. 1) maintaining contact with angle iron 23 causes switch 47 to engage terminal 51. This causes electrical energy to flow from battery 59 through switch 60 (it is assumed that manual switch 60 would be closed any time the combine is being operated) through switch 62, through contact 63, to line 64, to switch 47, through contact 51, through line 89 to solenoid 87 which would actuate valve 86 to provide a passage therethrough from line 85 to sump 90. Hydraulic fluid would now flow from hydraulic ram 56 lowering header 14 until contact was lost between switch 47 and contact 51. During this period of hydraulic flow, the fluid cannot pass through check valve 79 but moves through line 81, adjustable restrictor 91, through chamber 82, through line 85, through adjustable restrictor 92, and emptying into sump 90. There would also be flow from the left-hand end of poppet valve 84 through line 88 and fixed restrictor 98 to line 85 and thence to sump 90. This flow would reduce the closing pressure on poppet valve 84 so that it would move away from its seat permitting chamber 82 to empty into sump 83.

Figure 6:
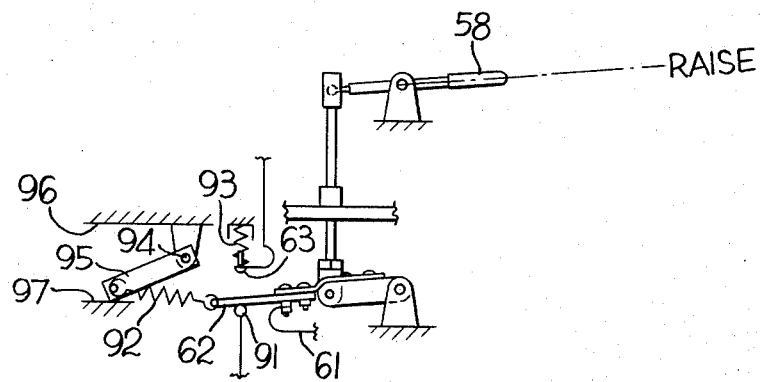
FIG. 6 is a diagrammatic view similar to FIG. 5 of the operating lever and its associated linkage when the lever is positioned in raise.

Manual means are also provided for raising or lowering header 14 and include operating lever 58 shown in FIG. 1 in a neutral position where such lever will remain until a force is applied to the lever. When a force is applied to lift the lever 58 into the raise position shown in FIG. 6, switch 62 will swing downward making electrical contact with raise contact 91. When the force on lever 58 is released both lever 58 and switch 62 will be returned by spring 92 to their original neutral position. If a force is applied to move the handle portion of lever 58 downwardly to the lower position the switch 62 will swing upwardly and make electrical connection with lowering contact 63 until the force on operating lever 58 is released. At this time lever 58 and switch 62 will be returned by spring 92 to the neutral position.

If on the other hand the force was not released when lever 58 was in the lowering position but an increased force was applied to move lever 58 into the automatic position then lever 58 would remain in the automatic position when the lever 58 is released because of the following reasons. As switch 62 is swung upwardly by the movement of lever 58, lowering contact 63 being resiliently mounted by means of spring 93 will deflect and allow switch 62 and spring 93 to continue their upward movement. When spring 92 passes pivot 94 of toggle 95; spring 92 will cause toggle 95 to swing against the upper stop 96 as shown in FIG. 5. The spring 92 in this new position holds switch 62 and control lever 58 in the automatic position until an upward force is applied to the handle portion of lever 58 causing spring 92 to again pass toggle pivot 94 causing the toggle 95 to swing downwardly to rest on lower stop 97. Spring 92 in this position will again urge switch 62 and lever 58 toward the neutral position.

It can now be understood that this invention has provided a mechanism in which one control lever 58 is provided to control all five of the header height functions including hold header, raise header, lower header, engage automatic control and to disengage automatic control.

This feature provides maximum convenience for the operator in which only one simple and natural movement of one hand is required to change the header position. For example, when changing from an automatically controlled position with the header near the ground to a manually controlled position well above the ground, this maneuver is one that must be performed quickly in order to prevent damage to the combine when approaching an obstacle in the field.

FIG. 1 illustrates the invention in the off or neutral position with header positioned in the center of its preselected height range. In this instance all three electrical switches are in their off positions. Master switch 60 is open, manual control switch 62 is not making connection with either raise contact 91 or lower contact 63, and automatic control switch 47 is not making contact with either the lower or raise contacts 51, 52, respectively, and therefore the control system is not in operation.

To activate the system, main switch 60 is first closed providing electrical connection for current flow from battery 59 through wire 61 to manual control switch 62. Assuming the harvester engine is started so that hydraulic pump 70 forces hydraulic fluid to flow at an appropriate rate through the hydraulic system and back to sump.

It is apparent that the system cannot act to change header height until the manual control level 58 is first moved from the neutral position. If the control lever 58 is now moved downward into either the lower or automatic positions the manual switch 62 will move upwardly and make electrical connection with lowering contact 63. Electrical current is then available through wire 64 to the automatic switch 47. The header height will not change, however, because the header is already at the desired height causing the automatic switch 47 to be held in its neutral position.

Assuming that the manual control level 58 is placed in the automatic position and that the combine now moves forward to a location where the ground level is lower. This will cause the automatic switch 47 to move toward contact 51. When electrical contact is established current flow through wire 89 will energize solenoid 87 thereby opening hydraulic valve 86 thus allowing the header to descend until the header is within the preselected height range at which time the automatic control switch 47 will be moved away from contact 51 interrupting current flow to solenoid 87 causing hydraulic valve 86 to return to its original closed position and thereby preventing continued downward movement of head 14.

As the combine continues its forward movement and a raise in the ground is encountered the automatic switch 47 is moved to raise contact 52 supplying current flow through wires 65 and 66 to energize solenoid 67 operating valve 68 causing header 14 to raise. When header 14 reaches the preselected height range the automatic switch 47 returns to its neutral position interrupting the current flow and thereby stopping the upward movement of header 14.

When it is desired to move header 14 to a position above the automatically controlled position, the control lever 58 is moved to the raise position. When header 14 reaches the desired position control lever 58 is released. Control lever 58 will immediately move to the neutral position stopping the upward movement of the header 14 where it will remain until control lever 58 is again moved. The header height can now be controlled manually and the header will move up or down in response to moving the control lever 58 into either the raise or lower positions.

It should be noted that manual control lever 58 may be used at any time to raise the header 14 but lowering the header with the manual control is possible only from a high position down to the preselected automatically controlled low position where the automatic switch 47 is automatically moved to its neutral position where the current flow to the lowering solenoid 87 is interrupted. This important feature provides protection from damaging header 14 resulting from operator error of running header 14 into the ground. This feature is accomplished by the wiring circuit arrangement wherein both the manual control switch 62 and the automatic control switch 47 are connected in the lowering circuit in series while in the raise circuit they are connected in parallel.

It should be noted that shaft 38 (see FIG. 2) is provided with a plurality of feeler members 36. In fact there is a feeler member 36 for each supporting structure 17 so that any one of these feeler members 36 is capable of moving its connected shaft 38 to produce a signal for raising or lowering the header. In addition, it should be noted that the members 36 do not engage the ground but transmit their signal in response to the position of angle member 23. Accordingly, members 36 are positioned out of the dirt and debris that might be contacted by a ground feeler.

It should also be noted that with the structure herein described, it is now possible to allow for a wider neutral zone that would be permitted in prior art devices so that the hydraulic system is not energized so frequently, as the floating cutter bar can and will respond to very small and frequent changes of ground contour, both longitudinally and laterally without actuating the raising or lowering mechanism.

The embodiments of the invention in which an exclusive property or privilege is claimed are defined as follows:

1. In combination in a combine harvester including a pivotally mounted cut crop receiving and conveying mechanism, a floatably mounted crop cutting device depending from the forward end of said mechanism, hydraulic means for raising or lowering said mechanism, said device including a generally longitudinally extending frame member pivotally mounted at its rearward end on said mechanism for movement about a horizontally transversely extending axis, said device being attached to the forward end of said frame member, and flexible means connecting said device with the forward end of said mechanism for permitting said device to ride on the ground while freely pivoting about said axis, the improvement comprising signal means carried by said mechanism and including a feeler member movably mounted on said mechanism and including a feeler member with a portion of said feeler member contacting said frame member, automatic control means actuated by said signal means in response to said frame member moving to a selected low or high position, said control means being connected to said hydraulic means for raising and lowering said mechanism for maintaining the position of said mechanism relative to said device.

2. The combination recited in claim 1 and wherein separate control means are provided for adjusting the height of said cut crop receiving mechanism independent of said crop cutting device, said separate control means being manually actuatable.

3. The combination recited in claim 2 and wherein said feeler members are individually adjustable relative to its coacting frame member.

4. The combination recited in claim 3 and wherein said feeler members are biased to contact their respective frame members.

5. The combination recited in claim 4 and wherein said feeler members are adjustably connected to a transversely extending shaft and said shaft is operatively connected to said control means to raise or lower said cut crop receiving mechanism responsive to the position of said feeler members.

6. The combination recited in claim 5 and wherein each of said frame members being provided with a ground contacting shoe positioned adjacent the forward end of said frame member, said ground contacting shoe being adapted to pivot said frame member in response to ground contour.

7. The combination recited in claim 6 and wherein said separate manual control means serves also to engage and disengage the automatic control means.

8. In combination in a combine harvester including a pivotally mounted cut crop receiving and conveying mechanism, hydraulic means for raising or lowering said cut crop receiving mechanism, a crop cutting device including a ground contacting element for supporting said crop cutting device at a preselected height above the ground, said crop cutting device being floatably mounted on and located adjacent the front end of cut crop receiving mechanism, said mounting providing free vertical floating movement of said crop cutting device over the ground relative to said mechanism within adjustable limits, the improvement comprising signal means carried by said mechanism including feeler means contacting said crop cutting device for detecting vertical movement thereof relative to said mechanism, control means actuated by said feeler means in response to said relative movement, said control means being connected to said hydraulic means for raising or lowering said mechanism into a preselected position relative to said crop cutting device.

9. The combination recited in claim 8 and wherein said crop cutting device includes a plurality of said elements in the nature of skids.

10. The combination recited in claim 8 and wherein a manually actuatable control is provided for controlling the following operations: raise mechanism, hold mechanism, lower mechanism, engage automatic mechanism control, and disengage automatic mechanism control.

11. The combination recited in claim 10 and wherein said manually actuatable control is prevented from lowering said mechanism to a position below the automatically controlled position.

* * * * *